US011013381B2

(12) United States Patent
Foster

(10) Patent No.: US 11,013,381 B2
(45) Date of Patent: May 25, 2021

(54) INTEGRATED AUTOMOBILE VACUUM SYSTEM

(71) Applicant: Robin Foster, Belvedere, CA (US)

(72) Inventor: Robin Foster, Belvedere, CA (US)

( * ) Notice: Subject to any disclaimer, the term of this patent is extended or adjusted under 35 U.S.C. 154(b) by 449 days.

(21) Appl. No.: 16/149,130

(22) Filed: Oct. 2, 2018

(65) Prior Publication Data

US 2020/0100636 A1 Apr. 2, 2020

(51) Int. Cl.
*A47L 7/00* (2006.01)
*B60S 1/64* (2006.01)
*A47L 9/16* (2006.01)
*A47L 9/00* (2006.01)
*A47L 9/12* (2006.01)

(52) U.S. Cl.
CPC .......... *A47L 7/0076* (2013.01); *A47L 9/0027* (2013.01); *A47L 9/0036* (2013.01); *A47L 9/0063* (2013.01); *A47L 9/127* (2013.01); *A47L 9/1666* (2013.01); *B60S 1/64* (2013.01)

(58) Field of Classification Search
CPC .... A47L 7/0076; A47L 9/1666; A47L 9/0027; A47L 9/0063; A47L 9/127; A47L 9/0036; A47L 9/1409; A47L 9/122; B60S 1/64
See application file for complete search history.

(56) References Cited

U.S. PATENT DOCUMENTS

| D277,516 | S | 2/1985 | Hayden |
| 6,128,804 | A | 10/2000 | Lee |
| 7,152,272 | B2 | 12/2006 | Rukavina |
| 7,266,859 | B2 | 9/2007 | Stone |
| 9,238,451 | B2 | 1/2016 | Norell |
| 2004/0107528 | A1 | 6/2004 | LeClear |
| 2016/0368461 | A1 | 12/2016 | Logli |
| 2017/0050622 | A1 | 2/2017 | Garcia |

FOREIGN PATENT DOCUMENTS

WO    WO2017031030    2/2017

*Primary Examiner* — David Redding

(57) ABSTRACT

An integrated automobile vacuum system for cleaning a vehicle includes a vacuum motor with an intake side and an exhaust side. A power unit is coupled to the vacuum motor and provides power. An intake pipe is coupled to the intake aperture. A mounting plate is coupled to the intake pipe and is configured to attach to an interior wall of the vehicle. The mounting plate has a hose aperture extending through the interior wall and coupled to the intake pipe. A vacuum hose is selectively engageable with the hose aperture of the mounting plate. An exhaust hose has a motor end coupled to the exhaust aperture and a collection end coupled to a collection unit. The collection unit is configured to collect debris sucked through the vacuum motor.

12 Claims, 5 Drawing Sheets

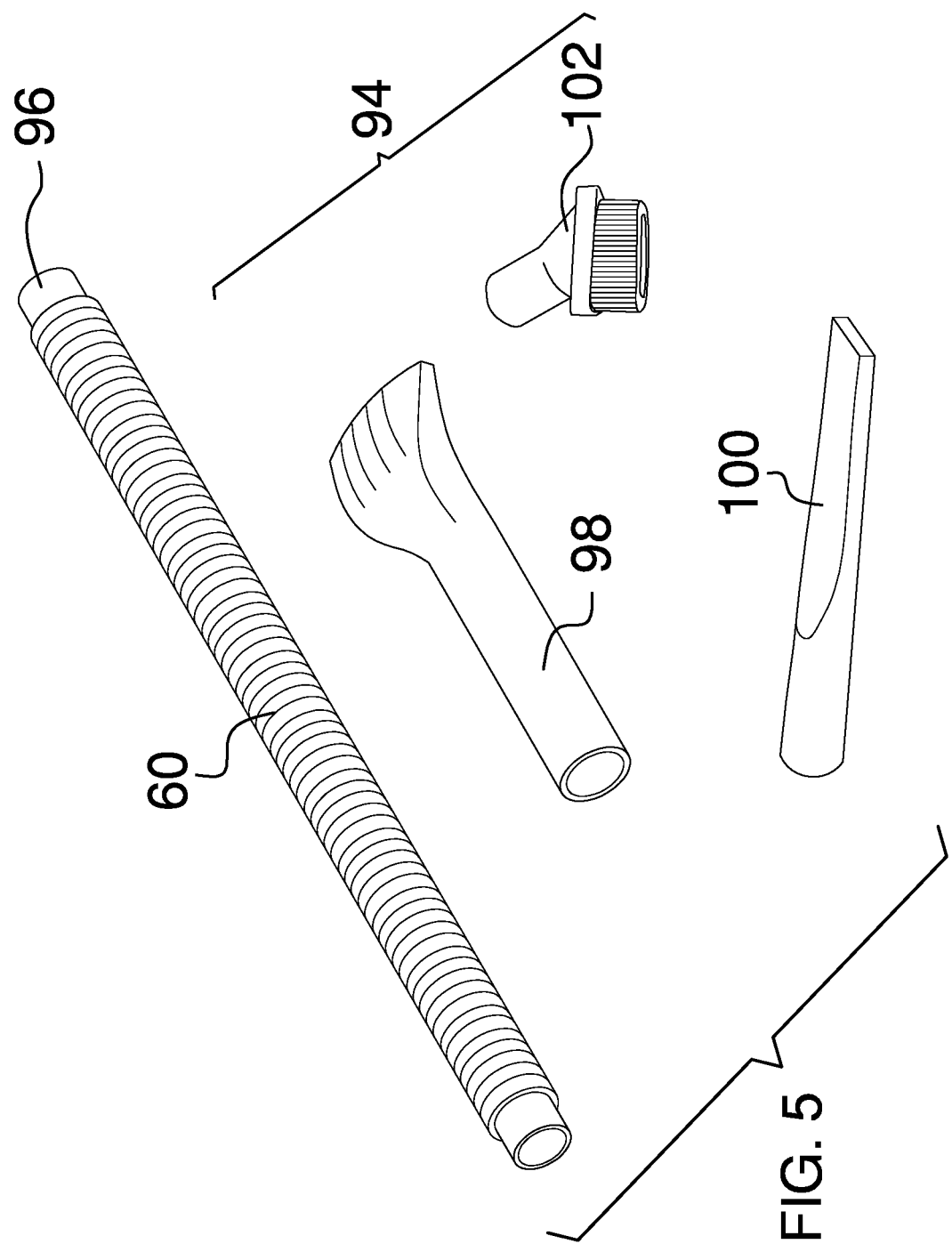

INTEGRATED AUTOMOBILE VACUUM SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98.

The disclosure and prior art relates to vacuums and more particularly pertains to a new vacuum for cleaning a vehicle.

BRIEF SUMMARY OF THE INVENTION

An embodiment of the disclosure meets the needs presented above by generally comprising a vacuum motor having a body wall extending between an intake side and an exhaust side. The intake side has an intake aperture extending therethrough and the exhaust side has an exhaust aperture extending therethrough. The vacuum motor is configured to be installed in a vehicle. A power unit is coupled to the body wall and provides power to the vacuum motor. An intake pipe is coupled to the intake aperture. A mounting plate is coupled to the intake pipe and is configured to attach to an interior wall of the vehicle. The mounting plate has a hose aperture extending through the interior wall and coupled to the intake pipe. A vacuum hose is selectively engageable with the hose aperture of the mounting plate. An exhaust hose has a motor end coupled to the exhaust aperture and a collection end coupled to a collection unit. The collection unit is configured to collect debris sucked through the vacuum motor.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 5 is an isometric detail view of an embodiment of the disclosure.

DETAILED DESCRIPTION OF THE INVENTION

Figure 1:
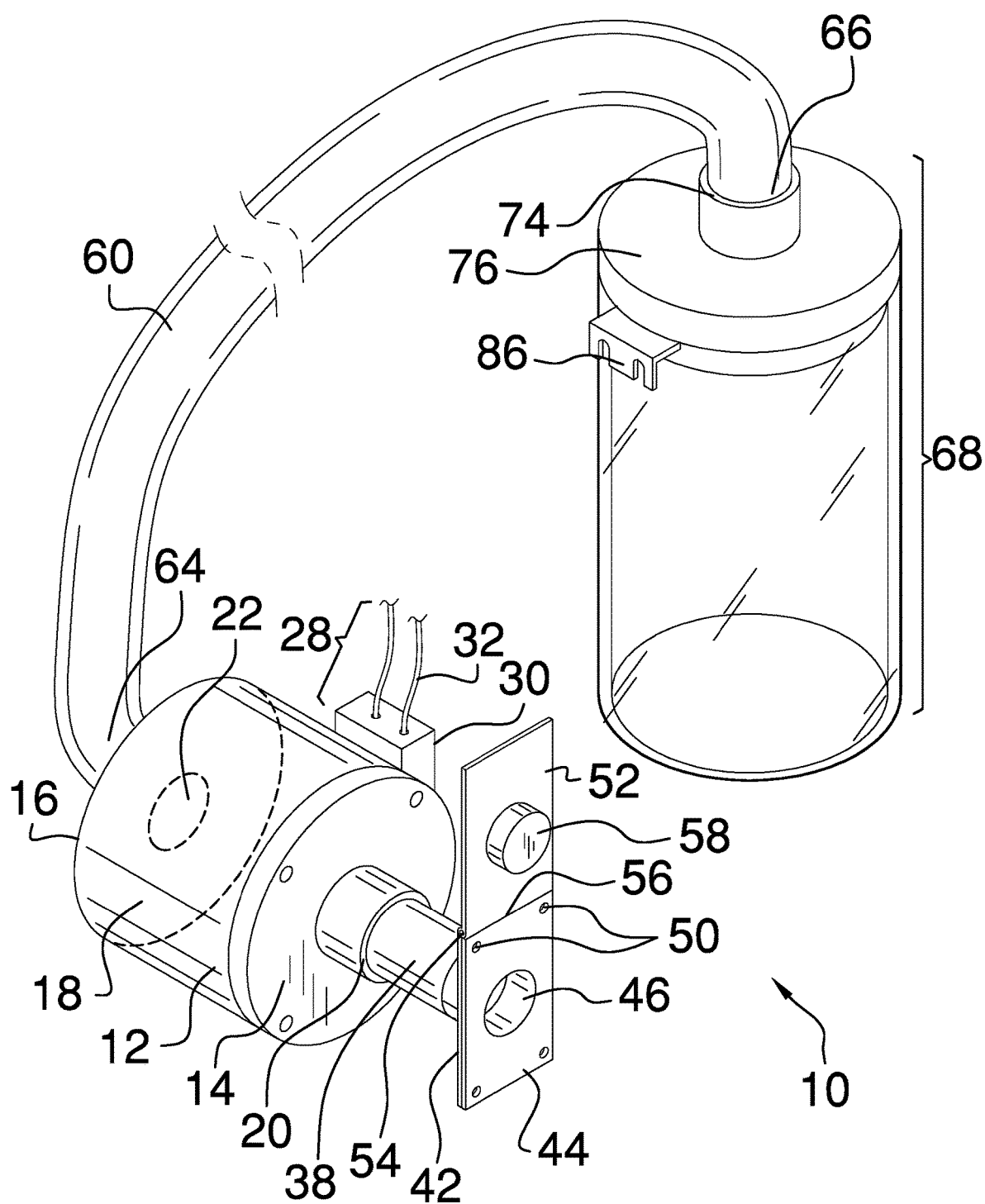
FIG. 1 is an isometric view of an integrated automobile vacuum system according to an embodiment of the disclosure.
Figure 2:
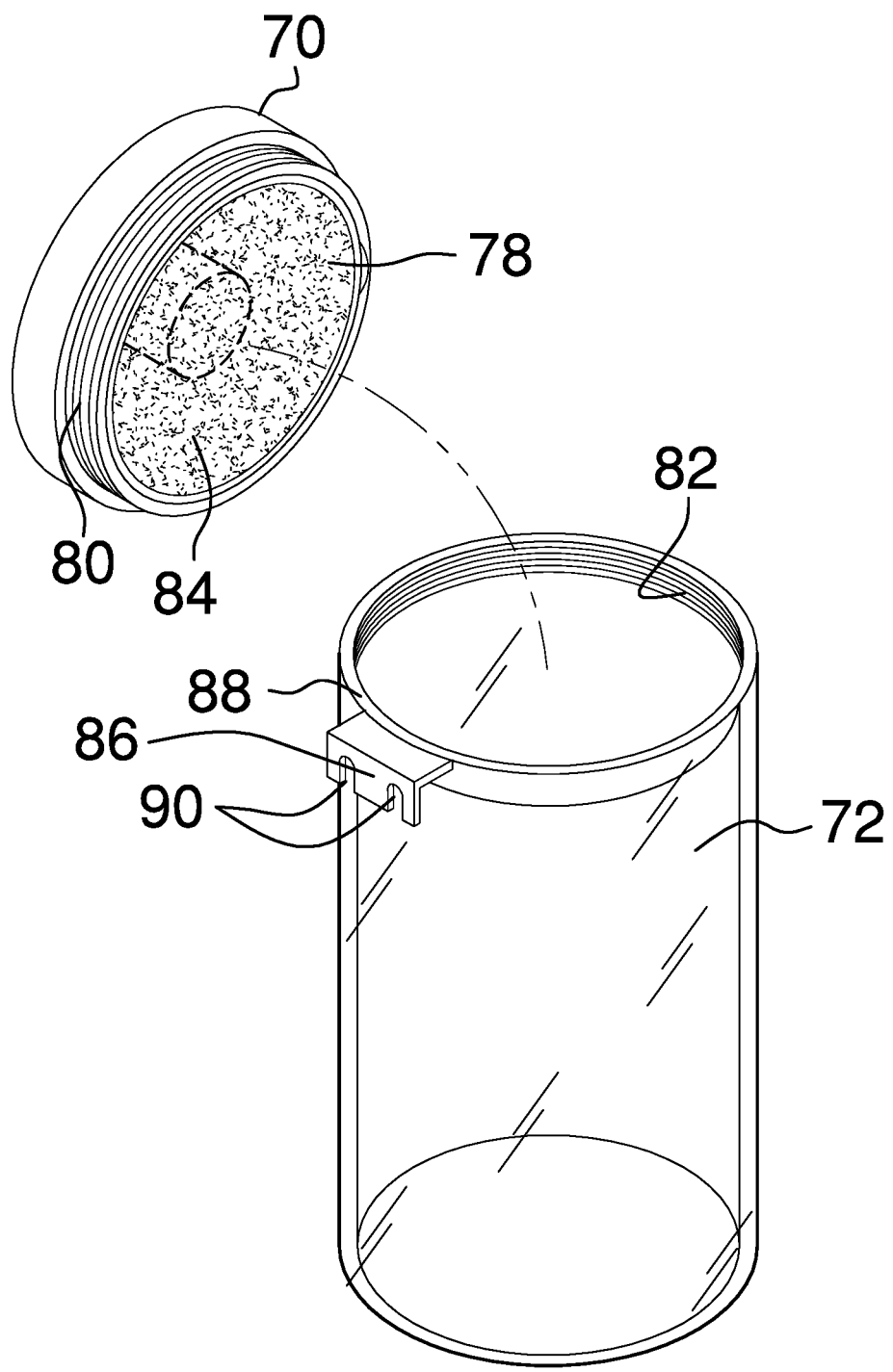
FIG. 2 is an isometric detail view of an embodiment of the disclosure.
Figure 3:
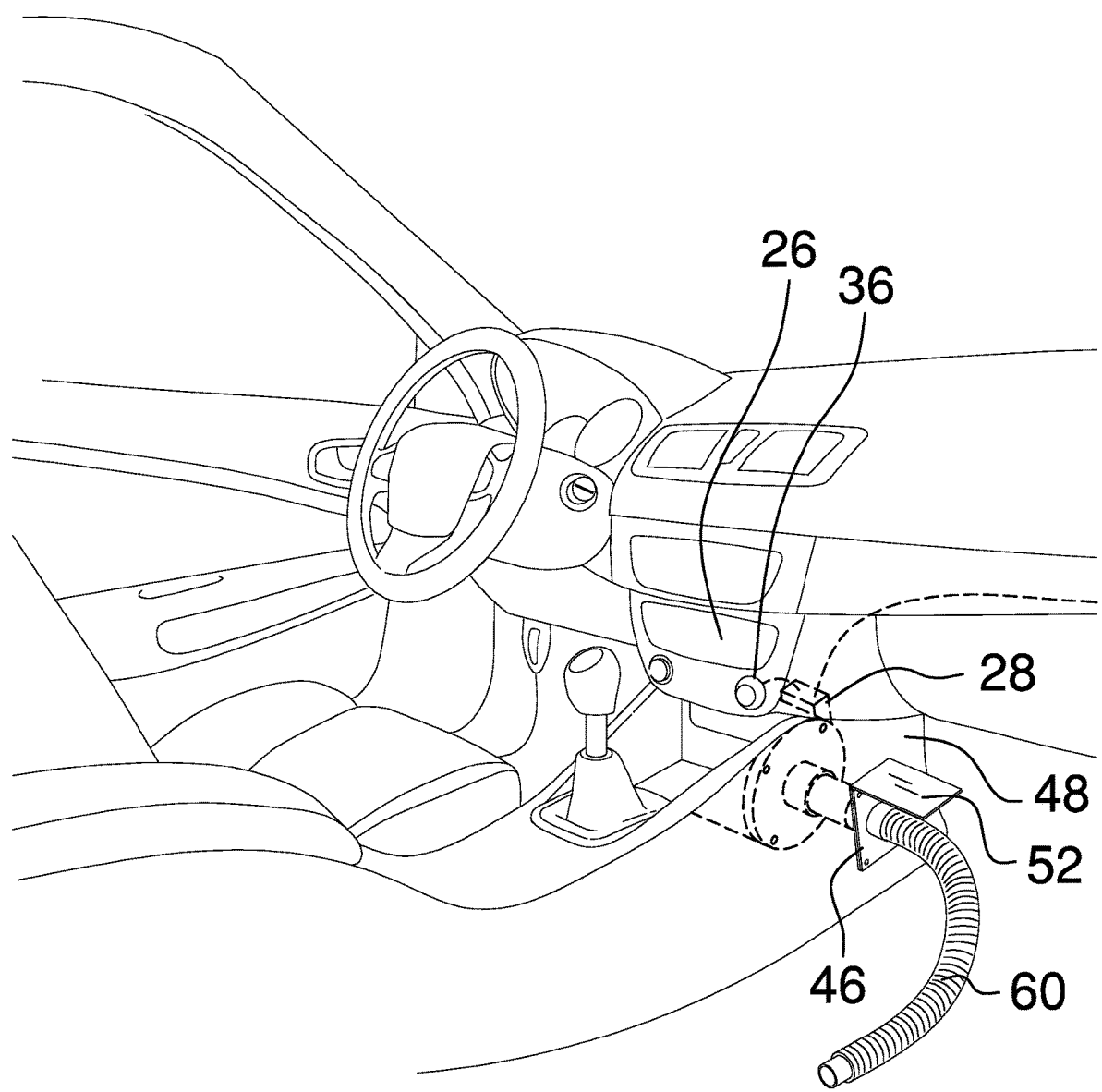
FIG. 3 is an in-use isometric view of an embodiment of the disclosure.
Figure 4:
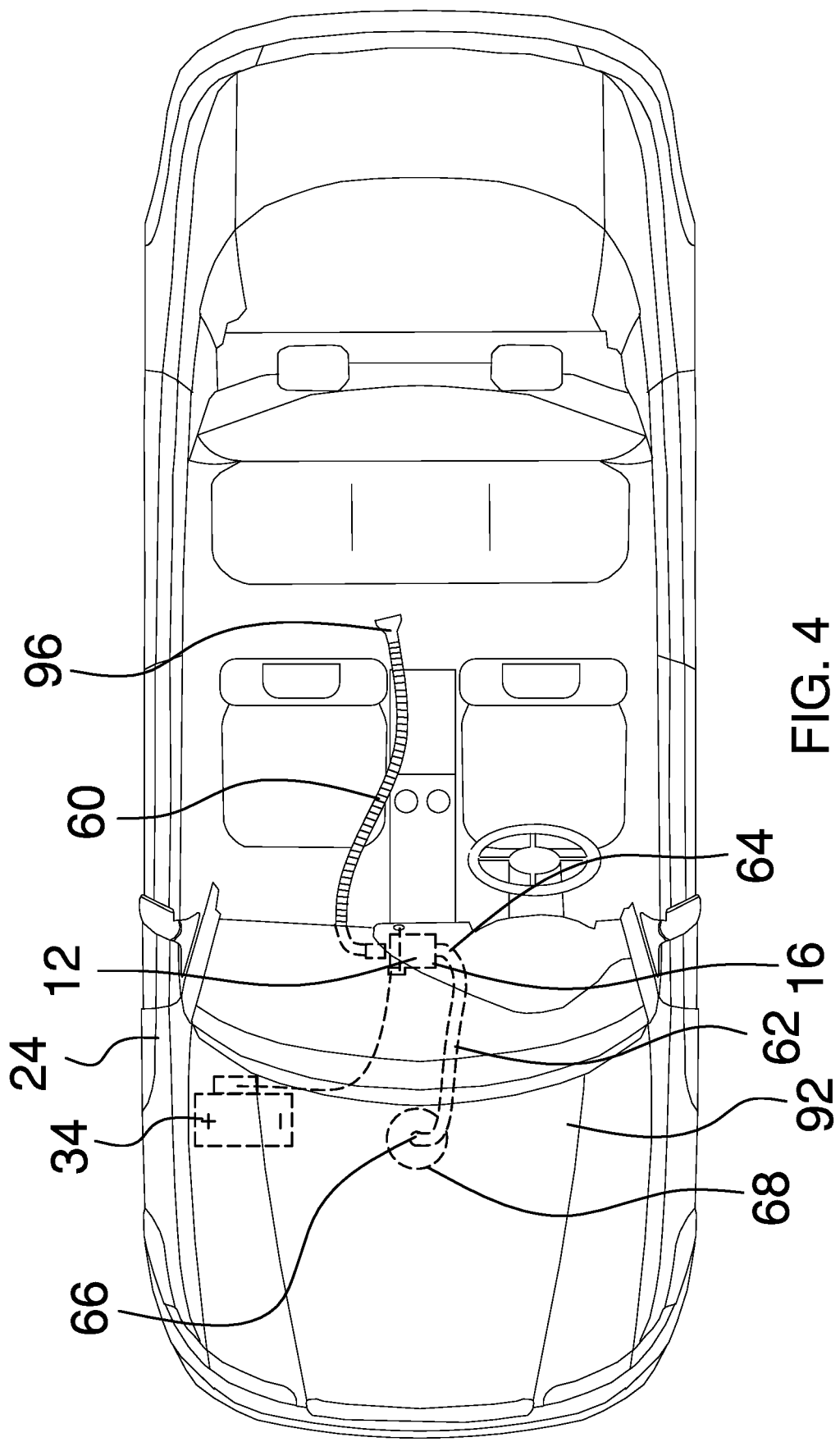
FIG. 4 is an in-use top plan view of an embodiment of the disclosure.

With reference now to the drawings, and in particular to FIGS. 1 through 5 thereof, a new vacuum embodying the principles and concepts of an embodiment of the disclosure and generally designated by the reference numeral 10 will be described.

As best illustrated in FIGS. 1 through 5, the integrated automobile vacuum system 10 generally comprises a vacuum motor 12 having an intake side 14, an exhaust side 16, and a body wall 18 extending between the intake side 14 and the exhaust side 16. The intake side 14 has an intake aperture 20 extending therethrough and the exhaust side 16 has an exhaust aperture 22 extending therethrough. The vacuum motor 12 is configured to be installed in a vehicle 24 and may be installed behind a console 26 of the vehicle. A power unit 28 is coupled to the body and is configured to provide power to the vacuum motor 12. The power unit 28 may comprise a housing 30 coupled to the body wall 18 and a wiring 32 coupled to the housing 30. The wiring 32 is configured to connect to a vehicle battery 34 for power and a control switch 36 to be operated from inside the vehicle 24.

An intake pipe 38 is coupled to the intake aperture 20 and a mounting plate 40 is coupled to the intake pipe 38. The mounting plate 40 may comprise a front plate 42 and a rear plate 44, each having a hose aperture 46 extending therethrough. The intake pipe 38 is coupled to the hose aperture 46 of the rear plate and the rear plate 44 is configured to mount to an outside of an interior wall 48 of the vehicle 24. The front plate 42 is coupled to the rear plate 44 through the interior wall and may be coupled through a plurality of mounting apertures 50 passing through each of the front plate 42 and the rear plate 44. There may be a cover plate 52 having a hinge 54 coupled to an upper edge 56 of the front plate. The cover plate 52 swingably covers and alternatively uncovers the front plate 42. The cover plate 52 has a plug 58 that is selectively engageable with the hose aperture 46 of the mounting plate to keep the cover plate 52 closed when the integrated automobile vacuum system 10 is not in use. A vacuum hose 60 is selectively engageable with the hose aperture 46 when the system is in use to allow access to all parts of the interior of the vehicle. The vacuum hose 60 may be collapsible.

An exhaust hose 62 has a motor end 64 and a collection end 66 with the motor end 64 coupled to the exhaust aperture 22. A collection unit 68 is coupled to the exhaust hose 62 and is configured to collect debris sucked through the vacuum motor 12. The collection unit 68 may comprise a lid 70 and a canister 72. The lid 70 has a lid aperture 74 extending through a top side 76 to a recessed cavity 78 with the lid aperture 74 being selectively enagageble with the collection end 66 of the exhaust hose. The lid 70 has a male threaded portion 80 that is selectively engageable with a female threaded portion 82 of the canister to allow the canister 72 to be separated and emptied when necessary. A filter 84 may be coupled within the recessed cavity 78 of the lid to absorb dust and other fine particles entering the collection unit 68. A mounting bracket 86 may be coupled to an upper rim 88 of the canister. The mounting bracket 86 has a pair of notches 90 that is selectively engageable within an engine compartment 92 of the vehicle, allowing a user to easily access the collection unit 68. There may also be a plurality of accessories 94 that is selectively engageable with a distal end 96 of the vacuum hose. The plurality of accessories 94 comprises a wide vacuum head 98 for general cleaning, a narrow vacuum head 100 for tight spaces, and a brush vacuum head 102 for flooring.

In use, the cover plate 52 is opened and the vacuum hose 60 is attached to the hose aperture 46. The vacuum motor 12 is then activated using the control switch 36 and a user can manipulate the vacuum hose 60 to clean the vehicle interior. When complete, the vacuum hose 60 is detached and the cover plate 52 is closed.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An integrated automobile vacuum system, the system comprising:
   a vacuum motor having an intake side, an exhaust side, and a body wall, the body wall extending between the intake side and the exhaust side, the intake side having an intake aperture extending therethrough and the exhaust side having an exhaust aperture extending therethrough, the vacuum motor being configured to be installed in a vehicle;
   a power unit coupled to the vacuum motor, the power unit being coupled to the body and being configured to provide power to the vacuum motor;
   an intake pipe coupled to the vacuum motor, the intake pipe being coupled to the intake aperture;
   a mounting plate coupled to the intake pipe, the mounting plate being configured to attach to an interior wall of the vehicle, the mounting plate having a hose aperture extending through the interior wall, the intake pipe being coupled to the hose aperture;
   a vacuum hose coupled to the mounting plate, the vacuum hose being selectively engageable with the hose aperture;
   an exhaust hose coupled to the vacuum motor, the exhaust hose having a motor end and a collection end, the motor end being coupled to the exhaust aperture; and
   a collection unit coupled to the exhaust hose, the collection unit being coupled to the collection end of the exhaust hose, the collection unit being configured to collect debris sucked through the vacuum motor.

2. The integrated automobile vacuum system of claim 1 further comprising the power unit comprising a housing coupled to the body wall and a wiring coupled to the housing, the wiring being configured to connect to a vehicle battery and a control switch.

3. The integrated automobile vacuum system of claim 1 further comprising the mounting plate comprising a front plate and a rear plate each having the hose aperture extending therethrough, the intake pipe being coupled to the hose aperture of the rear plate, the rear plate being configured to mount to an outside of the interior wall of the vehicle, the front plate being coupled to the rear plate through the interior wall.

4. The integrated automobile vacuum system of claim 3 further comprising a cover plate, the cover having a hinge coupled to an upper edge of the front plate, the cover plate swingably covering and alternatively uncovering the front plate.

5. The integrated automobile vacuum system of claim 4 further comprising the cover plate having a plug, the plug being selectively engageable with the hose aperture of the mounting plate.

6. The integrated automobile vacuum system of claim 1 further comprising the collection unit comprising a lid and a canister, the lid having a lid aperture extending through a top side to a recessed cavity, the lid aperture being selectively enagageble with the collection end of the exhaust hose, the lid having a male threaded portion being selectively engageable with a female threaded portion of the canister.

7. The integrated automobile vacuum system of claim 6 further comprising a mounting bracket coupled to the collection unit, the mounting bracket being coupled to an upper rim of the canister, the mounting bracket being selectively engageable within an engine compartment of the vehicle.

8. The integrated automobile vacuum system of claim 7 further comprising the mounting bracket having a pair of notches.

9. The integrated automobile vacuum system of claim 6 further comprising a filter coupled to the collection unit, the filter being coupled within the recessed cavity of the lid.

10. The integrated automobile vacuum system of claim 1 further comprising a plurality of accessories, the plurality of accessories being selectively engageable with a distal end of the vacuum hose, the plurality of accessories comprising a wide vacuum head, a narrow vacuum head, and a brush vacuum head.

11. An integrated automobile vacuum system, the system comprising:
- a vacuum motor having an intake side, an exhaust side, and a body wall, the body wall extending between the intake side and the exhaust side, the intake side having an intake aperture extending therethrough and the exhaust side having an exhaust aperture extending therethrough, the vacuum motor being configured to be installed in a vehicle;
- a power unit coupled to the vacuum motor, the power unit being coupled to the body and being configured to provide power to the vacuum motor, the power unit comprising a housing coupled to the body wall and a wiring coupled to the housing, the wiring being configured to connect to a vehicle battery and a control switch;
- an intake pipe coupled to the vacuum motor, the intake pipe being coupled to the intake aperture;
- a mounting plate coupled to the intake pipe, the mounting plate comprising a front plate and a rear plate, each of the front plate and the rear plate having a hose aperture extending therethrough, the intake pipe being coupled to the hose aperture of the rear plate, the rear plate being configured to mount to an outside of the interior wall of the vehicle, the front plate being coupled to the rear plate through the interior wall;
- a cover plate, the cover having a hinge coupled to an upper edge of the front plate, the cover swingably covering and alternatively uncovering the front plate, the cover plate having a plug, the plug being selectively engageable with the hose aperture of the mounting plate;
- a vacuum hose coupled to the mounting plate, the vacuum hose being selectively engageable with the hose aperture;
- an exhaust hose coupled to the vacuum motor, the exhaust hose having a motor end and a collection end, the motor end being coupled to the exhaust aperture;
- a collection unit coupled to the exhaust hose, the collection unit comprising a lid and a canister, the lid having a lid aperture extending through a top side to a recessed cavity, the lid aperture being selectively enageble with the collection end of the exhaust hose, the lid having a male threaded portion being selectively engageable with a female threaded portion of the canister, the collection unit being configured to collect debris sucked through the vacuum motor;
- a filter coupled to the collection unit, the filter being coupled within the recessed cavity of the lid; and
- a mounting bracket coupled to the collection unit, the mounting bracket being coupled to an upper rim of the canister, the mounting bracket having a pair of notches, the mounting bracket being selectively engageable within an engine compartment of the vehicle.

12. An integrated automobile vacuum system, the system comprising:
- a vacuum motor having an intake side, an exhaust side, and a body wall, the body wall extending between the intake side and the exhaust side, the intake side having an intake aperture extending therethrough and the exhaust side having an exhaust aperture extending therethrough, the vacuum motor being configured to be installed in a vehicle;
- a power unit coupled to the vacuum motor, the power unit being coupled to the body and being configured to provide power to the vacuum motor, the power unit comprising a housing coupled to the body wall and a wiring coupled to the housing, the wiring being configured to connect to a vehicle battery and a control switch;
- an intake pipe coupled to the vacuum motor, the intake pipe being coupled to the intake aperture;
- a mounting plate coupled to the intake pipe, the mounting plate comprising a front plate and a rear plate, each of the front plate and the rear plate having a hose aperture extending therethrough, the intake pipe being coupled to the hose aperture of the rear plate, the rear plate being configured to mount to an outside of the interior wall of the vehicle, the front plate being coupled to the rear plate through the interior wall;
- a cover plate, the cover having a hinge coupled to an upper edge of the front plate, the cover swingably covering and alternatively uncovering the front plate, the cover plate having a plug, the plug being selectively engageable with the hose aperture of the mounting plate;
- a vacuum hose coupled to the mounting plate, the vacuum hose being selectively engageable with the hose aperture;
- an exhaust hose coupled to the vacuum motor, the exhaust hose having a motor end and a collection end, the motor end being coupled to the exhaust aperture;
- a collection unit coupled to the exhaust hose, the collection unit comprising a lid and a canister, the lid having a lid aperture extending through a top side to a recessed cavity, the lid aperture being selectively enageble with the collection end of the exhaust hose, the lid having a male threaded portion being selectively engageable with a female threaded portion of the canister, the collection unit being configured to collect debris sucked through the vacuum motor;
- a filter coupled to the collection unit, the filter being coupled within the recessed cavity of the lid;
- a mounting bracket coupled to the collection unit, the mounting bracket being coupled to an upper rim of the canister, the mounting bracket having a pair of notches, the mounting bracket being selectively engageable within an engine compartment of the vehicle; and
- a plurality of accessories, the plurality of accessories being selectively engageable with a distal end of the vacuum hose, the plurality of accessories comprising a wide vacuum head, a narrow vacuum head, and a brush vacuum head.

* * * * *